United States Patent [19]

Thies et al.

[11] 4,333,752
[45] Jun. 8, 1982

[54] ADSORBENT CARTRIDGE FOR THE EXHAUST OF DIAZO PROCESS MACHINES

[75] Inventors: Edward J. Thies, Detroit; Norman Michlin, Southfield, both of Mich.

[73] Assignee: Michlin Chemical Corporation, Detroit, Mich.

[21] Appl. No.: 111,516

[22] Filed: Jan. 14, 1980

[51] Int. Cl.³ ............................................. B01D 53/04
[52] U.S. Cl. ...................................... 55/387; 55/518; 55/519
[58] Field of Search .................. 55/70, 387, 389, 512, 55/518, 519, DIG. 31; 206/604, 620, 625, 634; 210/282; 229/37 R, DIG. 14; 354/300

[56] References Cited

U.S. PATENT DOCUMENTS

| | | | |
|---|---|---|---|
| 1,737,532 | 11/1929 | Allen | 55/387 |
| 1,950,502 | 3/1934 | Madan | 55/387 X |
| 2,614,883 | 10/1952 | Anderson, Jr. et al. | 55/387 |
| 3,047,993 | 8/1962 | Robbins | 55/387 X |
| 3,269,635 | 8/1966 | Bergstein et al. | 229/37 R X |
| 3,679,369 | 7/1972 | Hashimoto et al. | 55/70 X |
| 3,720,150 | 3/1973 | Hurtig et al. | 55/70 X |
| 4,059,409 | 11/1977 | Barto et al. | 55/387 X |
| 4,092,658 | 5/1978 | Schroter | 354/300 |
| 4,166,728 | 9/1979 | Degenhardt et al. | 55/70 X |
| 4,167,319 | 9/1979 | Feitzinger | 354/300 |

Primary Examiner—Robert H. Spitzer
Attorney, Agent, or Firm—Krass, Young & Schivley

[57] ABSTRACT

A disposable cartridge filled with a chemical composition that acts as an adsorbent for ammonia vapor is adapted to be used in connection with a diazo process printing machine having a vacuum exhausted chamber. Exhaust from the chamber is passed through the cartridge to remove the noxious ammonia vapors and then is vented into the atmosphere. The cartridge is housed in an elongated rectangular cardboard box having three end flaps formed at each of its opposed open ends. Two opposed flaps of each set are formed with central holes and a plastic screen section adhered between these flaps to retain and allow access to the center section of the box which contains the adsorbent chemical. The center end flaps have knock-outs or tear strips that allow holes to be formed in their centers. These center end flaps cover the screens during shipment and when the cartridge is ready for use the center sections of these end flaps are knocked-out to allow the machine exhaust to be vented into and out of the cartridge.

10 Claims, 6 Drawing Figures

U.S. Patent   Jun. 8, 1982   4,333,752
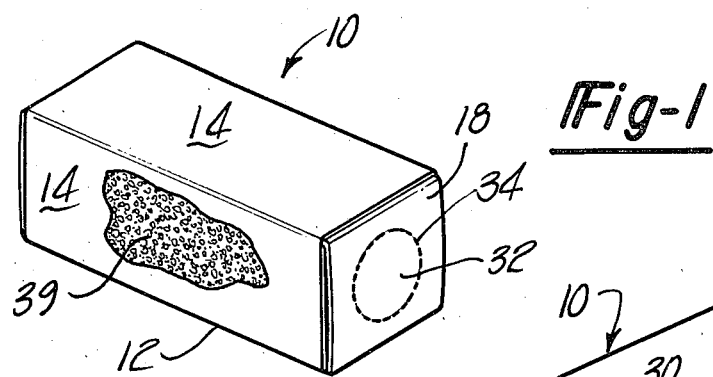
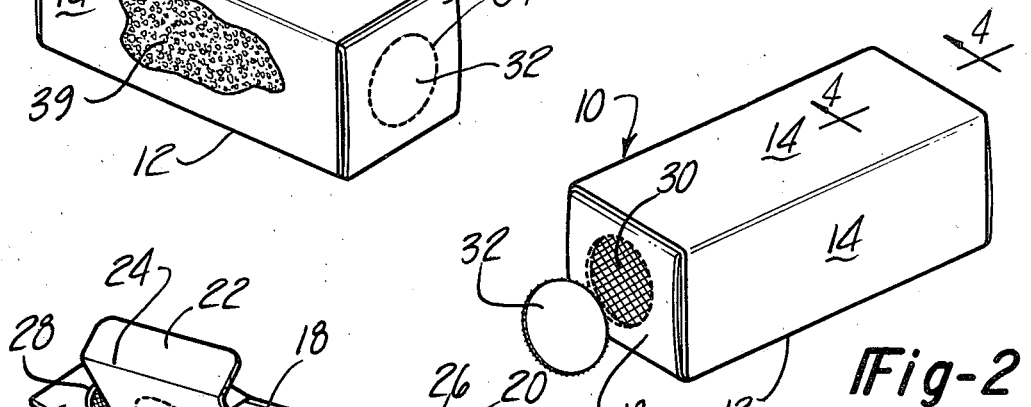
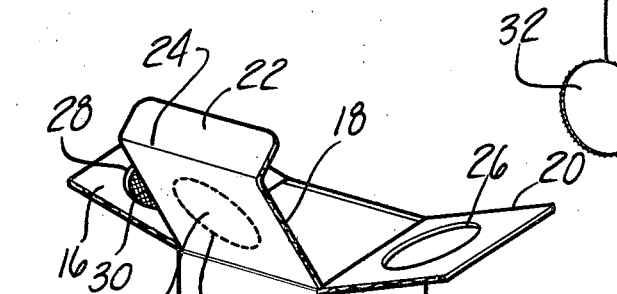
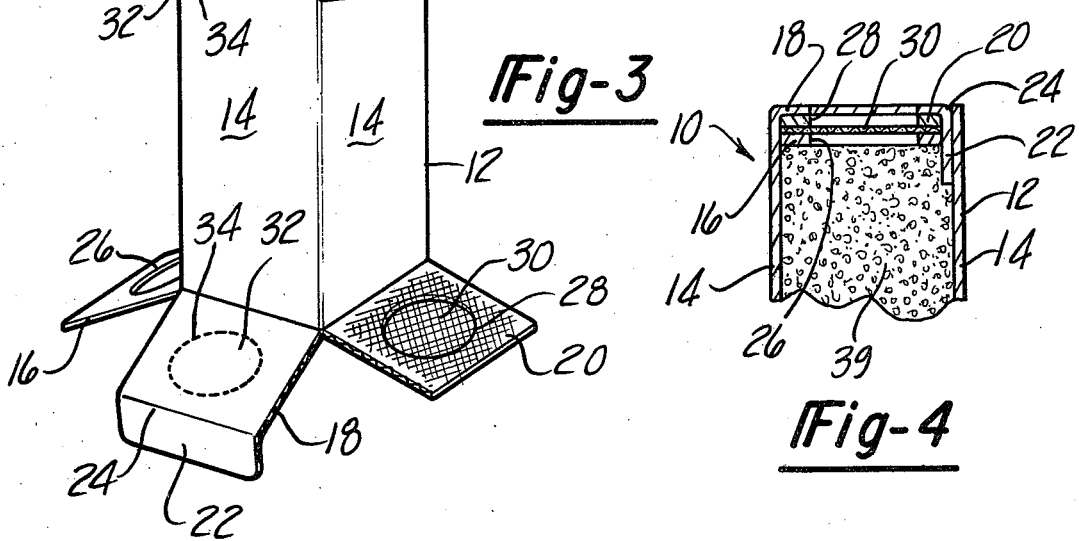
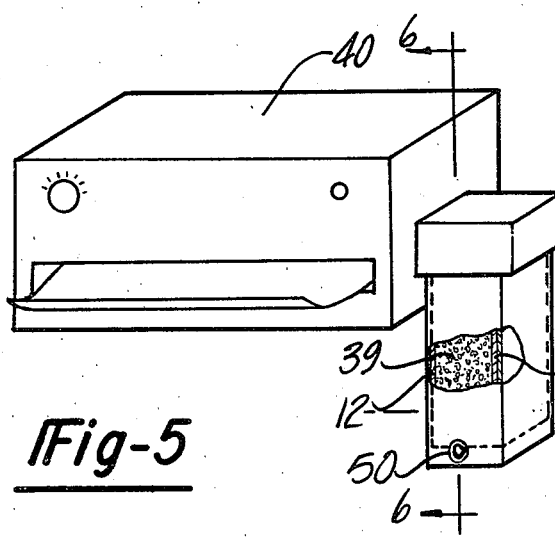
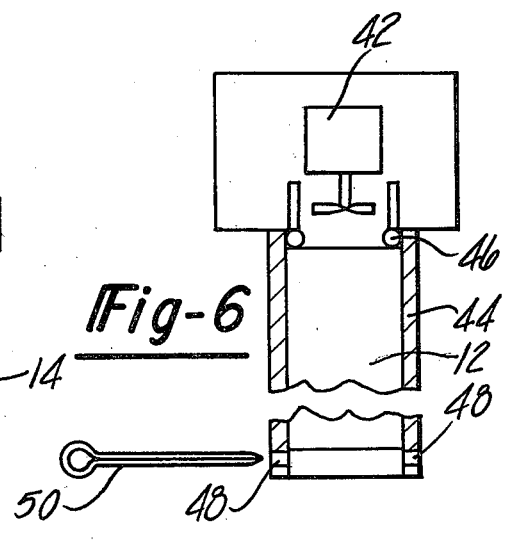

ADSORBENT CARTRIDGE FOR THE EXHAUST OF DIAZO PROCESS MACHINES

BACKGROUND OF THE INVENTION

1. Field of the Invention

This invention relates to adsorbents for removing ammonia from the exhaust of diazo process printing machines and more particularly to a disposable cartridge filled with such ammonia adsorbent.

2. Prior Art

In the diazo printing process a latent image on specially coated paper is developed by exposure to ammonia vapor. The ammonia vapor has an unpleasant odor and may be harmful to human health in heavy concentrations. In order to minimize the ammonia vapor released to the atmosphere surrounding the machines by either seepage from the development chamber of the machine or transfer from the developed paper after it is removed from the machine, many diazo process machines employ blowers to draw vapor from the development chambers or exhaust chambers through which the paper is passed before it is released to the atmosphere. In large volume, heavy duty, diazo printing machines this exhaust is often vented to the exterior of the building housing the machines to minimize the exposure of operating personnel to the noxious ammonia vapor but with smaller machines this exterior venting is often impractical or uneconomical. It has been proposed that the ammonia laden exhaust from these smaller machines be passed over chemical ammonia adsorbents and then vented directly in the room housing the machine. Examples of patents disclosing venting arrangements of this type include U.S. Pat. Nos. 4,092,658; 4,167,319; 4,059,409; 3,720,150 and 3,679,369.

These chemical adsorbents become saturated with ammonia vapor over a period of use and gradually lose their effectiveness, so they must be replaced. In some systems the adsorbent is in particle or granular form and the saturated adsorbent is emptied out of an adsorbent cartridge and the cartridge is refilled from a bulk supply. This process is often inconvenient and time consuming and it is an object of the present invention to provide a more convenient and economical system for packaging, transporting and using ammonia adsorbent chemicals.

SUMMARY OF THE INVENTION

The present invention broadly contemplates a low-cost, disposable container that serves as both the packaging container and use receptacle for an ammonia adsorbent which fills the container. Prior to use the container is sealed to protect the adsorbent from the atmosphere. When the container is to be used the seals are removed so that the ammonia vapor may be pressed into the container, to contact the adsorbent and then expelled from the container into the atmosphere. When the adsorbent has become saturated with ammonia vapor the entire container is discarded and replaced with a container of fresh adsorbent.

In a preferred embodiment of the invention, which will subsequently be disclosed in detail, the adsorbent cartridge employs an elongated, corrugated cardboard box as the container. The box is square in cross section and its two longitudinally opposed ends are open. Three end flaps are formed as extensions of three opposed side walls of the box at each end. The two side flaps of each set have the same dimensions as the cross section of the box so that they extend across and close off the box when supported normally to their end walls. The center end flap of each pair has the same configuration but includes an extending tongue at its far end. The two side flaps of each pair are formed with large circular holes and a section of fine plastic screening is sandwiched between these two end flaps and secured by adhesive so that each screen closes off one end of the box. The interior of the box is plastic coated so as to be moisture proof and an adsorbent preferably taking the form of activated charcoal impregnated with phosphoric acid intermixed with excelsior is disposed within the box.

The center end flaps at each end extend over and seal off the screen ends with the tongues of these end flaps inserted between the edges of the two end flaps and the interior wall of the box. The center end flaps have knock-outs formed by a circular line of perforations, or alternatively a tear strip. The cartridge is shipped and stored with the knock-out in place and the knock-out is manually removed when the cartridge is ready for use. After the knock-outs have been removed the cartridge is inserted into a suitable holder associated with the machine and the exhaust is passed through one screen end of the cartridge and out the other into the atmosphere. The entire cartridge is discarded when the adsorbents have become saturated with the ammonia vapor.

The cartridge of the present invention is thus economical, convenient to use and highly effective in operation.

Other objectives, advantages and applications of the present invention will be made apparent by the following detailed description of the preferred embodiment of the invention. The description makes reference to the accompanying drawings in which:

FIG. 1 is a perspective view of an ammonia adsorbent cartridge formed in accordance with the present invention with the end seal in place, partially broken away to show the contents;

FIG. 2 is the view of the cartridge with the end seal partially removed;

FIG. 3 is a perspective view of the container employed with the cartridge of the present invention before sealing;

FIG. 4 is a sectional view through an end of the cartridge of the present invention, taken along lines 4—4 of FIG. 2;

FIG. 5 is a perspective view of a diazo printing machine equipped with the cartridge of the present invention, partially broken away for purposes of illustration; and FIG. 6 is a sectional view through the cartridge holder and lower portion of the diazo printing machine of FIG. 5, taken along line 6—6 of FIG. 5.

The cartridge of the present invention, generally indicated at 10, is housed in an elongated container 12. The container is formed of a low cost, rigid, sheet material, and preferably corrugated cardboard of a sandwich construction. Alternatively other materials such as rigid plastic might be employed for the container. If the box is formed from material that does not have moisture resistant properties, such as corrugated cardboard, the interior of the box is coated with a waterproof plastic.

The exact shape of the container, and dimensions, will be dependent upon the diazo printing machine with which the cartridge is to be used but the cartridge is preferably in the form of an elongated rectangular container having a square cross section. The container has four elongated sides 14 and open ends. Each open end is identical and is formed with three end flaps, 16, 18 and 20. The end flaps at both ends of the box are identified with the same numerals because of their identical construction. Each of the end flaps is preferably formed integrally with the sides 14 of the container with a score line formed between the end flap and its associated side 14 so that the end flap may fold with respect to its side. The flaps 16 and 20 are formed on opposed side walls and the flap 18 is formed from the side wall intermediate the two side walls to which the flap 16 and 18 are attached. Each of the end flaps preferably has the same width as its associated end wall, and the two side flaps 16 and 20 have a similar length, so that their area is the same as the cross-section of the box 12. The center end flaps 18 have a similar length and additionally have extending tongues 22 formed on their far ends and joined to the end flaps by score lines 24.

The side end flaps 16 and 20 have central circular holes 26 and 28, respectively, formed through them. The holes 26 and 28 are of the same size and are formed so that they align with one another when the flaps are folded. A square of a fine plastic screen material 30 is adhered to the inner side of each of the flaps 20 so as to cover the hole in that flap. The inner side of flap 20 is the side that forms an extension of the inner side of its associated side wall 14.

The center flaps 24 are each formed with a central circular knock-out section 32. The knock-out section is defined by perforations 34 extending through the flap 18. In alternative embodiments a tear thread could be formed within the end flap in a circular pattern. Either these arrangements, or obvious alternatives, allow the knock-outs 32 to be manually removed when the cartridge is to be placed into use.

In the assembled cartridge, the end flaps 16 are folded over their associated normal ends and then covered by the opposite flap 20. The contacting surfaces of these two flaps are adhered to one another to sandwich the screen 30 between them. The tongues 22 of the center end flaps 18 are then inserted between the side edges of the flaps 16 and 20 and the opposite wall 14, as illustrated in FIG. 4. Adhesive may be placed on the tongues to secure them into position. Before this closure process the box is filled with one of the ammonia adsorbent materials 39 known to the prior art, and preferably a mixture of activated charcoal impregnated with phosphoric acid and excelsior. The plastic coating on the interior of the box 12 prevents the moisture in the phosphoric acid from leaking through the box.

The box is shipped with the knock-outs 32 in place, and the knock-outs cover the screens 30 to protect the contents of the box. When the box is to be used the knock-outs are manually removed exposing the two screens 30 in the manner illustrated in FIG. 2.

FIGS. 5 and 6 illustrate the manner in which the cartridge is used with a typical diazo printing machine 40. The exact construction of the machine 40 is not important to the present invention. The machine is equipped with a blower 42 that ventilates either the development chamber of the machine, a vacuum chamber through which the developed paper passes before leaving the machine, or both. The blower 42 forces this exhaust down through a rectangular exhaust tube 44 having inner dimensions generally complementary to the outer dimensions of the box 12.

A rubber gasket 46 surrounds the top edge of the rectangular tube 44 just below the blower. Holes 48 are formed in opposed points in the sidewalls of the rectangular tube 44 and a pin 50 is provided for insertion through the holes 48.

The box 12, with the knock-outs removed, is inserted upwardly through the bottom of the tube 44 until one of the ends abuts the rubber gasket 46. The box is then pressed upwardly against the gasket and the pin 50 is inserted through the holes 48 to retain the cartridge in the tube 44. When the blower 42 is energized, the ammonia laden exhaust from the diazo printing machine 50 is forced into the upper end of the box 12, through the screen 30, by the blower 42. The exhaust passes through the adsorbent material 39 and out through the screen 30 at the bottom of the box 12, to the atmosphere of the room in which the printing machine is being supported. Alternatively, this exhaust could be vented externally from the room.

When the adsorbent in the cartridge has become saturated with ammonia vapor the pin 50 is withdrawn, allowing the box 12 to fall from the tube 44 and the entire cartridge is discarded and replaced with a fresh cartridge.

The embodiments of the invention in which an exclusive property or privilege is claimed are defined as follows:

1. A disposable cartridge for processing ammonia-laden exhaust gasses from a diazo process printing machine, comprising:
an elongated tubular container, rectangular in cross section having its opposed ends closed off by first end flaps integrally secured to one side wall of the container;
second end flaps at each end of the container formed by extensions of side walls thereof adjacent to the one side wall to which the first end flaps are secured, said second end flaps having central apertures therein;
means formed in each first end flap to allow the manual removal of a central section in the first end flaps;
screens secured to each of said second end flaps so as to cover the apertures therein; and
an ammonia adsorbent material disposed within the container, between the screens, whereby the first end flaps close off the container ends prior to use of the cartridge and the central sections of each first end flap may be manually removed when the cartridge is to be placed into use so that the exhaust from the diazo printer may be passed into the cartridge through one end screen to contact the adsorbent, and out of the cartridge through the other end screen.

2. The adsorbent cartridge of claim 1 including a pair of second end flaps disposed at each end of the container and secured to ends of walls of the container so that surfaces of each pair align in overlapping relationship when folded inwardly over the container, and wherein apertures are formed through the central section of each of the second flaps and said screens are sandwiched between the pair of second end flaps at each end of the container and are adhered to the contacting surfaces of the end flaps to close off said apertures in the second end flaps.

3. The adsorbent cartridge of claim 1 wherein the container is formed of corrugated cardboard and the first end flaps further include tongue portions which are folded so as to engage opposing walls of the container.

4. The adsorbent container of claim 3 wherein in said means for manually removing central sections of the first end flaps comprises perforations formed through each of the end flaps so as to outline a central section of the end flap.

5. The adsorbent container of claim 1 in which said means for manually removing the central section in each of the first end flaps comprises a tear thread embedded within the end flap so that forces imposed on one end of the strip cause separation of the central section from the end flap.

6. The adsorbent cartridge of claim 1 in which said filter material comprises a mixture of activated carbon particles impregnated with phosphoric acid.

7. A cartridge for use in connection with a diazo printing machine, operative to process exhaust gasses derived from the machine to render the gasses less noxious comprising:

a corrugated cardboard box, rectangular in cross section, having four elongated closed sides and sets of three end flaps formed at each of the longitudinally displaced ends of the box, each end flap in a set being secured to the end of a different side wall of the box to project outwardly therefrom in a foldable manner;

apertures formed centrally through two of the flaps secured to opposite end sidewalls in each set;

a pair of screen members, one secured at each end of the container by being sandwiched between and adhered to said two end flaps in each set so that the screen extends normally to the longitudinal axis of the container and covers the apertures in the two end flaps, and means formed in each of the center flaps of each set for removing a central section from such end flap whereby the center end flap of each set may be disposed over said screens so as to close off the screens prior to placement of the cartridge in use and when the cartridge is ready for use the center section of each of the two center end flaps of a set may be manually removed so that exhaust gasses from a diazo printing machine may be passed into the cartridge through one of the end screens and may exit from the cartridge from the other end; and an ammonia adsorbent media disposed within the box.

8. The adsorbent cartridge of claim 7 wherein the interior of the box is coated to prevent passage of moisture through the walls of the box.

9. The adsorbent cartridge of claim 7 wherein the ammonia adsorbent media includes phosphoric acid.

10. The adsorbent cartridge of claim 7 wherein each of the center end flaps includes a normally bent-in section adapted to act as a tongue and extend alongside the interior edgewall of the side of the box opposite to the side to which that end flap is secured.

* * * * *